United States Patent
Stone

(10) Patent No.: US 11,529,737 B2
(45) Date of Patent: Dec. 20, 2022

(54) SYSTEM AND METHOD FOR USING VIRTUAL/AUGMENTED REALITY FOR INTERACTION WITH COLLABORATIVE ROBOTS IN MANUFACTURING OR INDUSTRIAL ENVIRONMENT

(71) Applicant: Raytheon Company, Waltham, MA (US)

(72) Inventor: Kristen M. Stone, Townsend, MA (US)

(73) Assignee: Raytheon Company, Waltham, MA (US)

( * ) Notice: Subject to any disclaimer, the term of this patent is extended or adjusted under 35 U.S.C. 154(b) by 337 days.

(21) Appl. No.: 16/836,569

(22) Filed: Mar. 31, 2020

(65) Prior Publication Data
US 2021/0237275 A1 Aug. 5, 2021

Related U.S. Application Data

(60) Provisional application No. 62/968,075, filed on Jan. 30, 2020.

(51) Int. Cl.
*B25J 9/16* (2006.01)
*G06T 7/70* (2017.01)
(Continued)

(52) U.S. Cl.
CPC ............ *B25J 9/1689* (2013.01); *B25J 9/163* (2013.01); *G06F 3/011* (2013.01); *G06T 7/20* (2013.01); *G06T 7/70* (2017.01)

(58) Field of Classification Search
CPC . B25J 9/1689; B25J 9/163; B25J 13/00; B25J 9/1671; G06F 3/011; G06T 7/20;
(Continued)

(56) References Cited

U.S. PATENT DOCUMENTS 7,714,895 B2 5/2010 Pretlove et al.
9,283,675 B2 3/2016 Hager et al.
(Continued)

FOREIGN PATENT DOCUMENTS

WO 2005/039837 A1 5/2005
WO 2011/160222 A1 12/2011
(Continued)

OTHER PUBLICATIONS

International Search Report and Written Opinion of the International Searching Authority in connection with International Patent Application No. PCT/US2020/064903 dated Mar. 25, 2021, 11 pages.

(Continued)

*Primary Examiner* — Rodney Amadiz

(57) ABSTRACT

A method includes determining a movement of an industrial robot in a manufacturing environment from a first position to a second position. The method also includes displaying an image showing a trajectory of the movement of the robot on a wearable headset. The displaying of the image comprises at least one of: displaying an augmented reality (AR) graphical image or video of the trajectory superimposed on a real-time actual image of the robot, or displaying a virtual reality (VR) graphical image or video showing a graphical representation of the robot together with the trajectory.

20 Claims, 6 Drawing Sheets

(51) Int. Cl.
*G06F 3/01* (2006.01)
*G06T 7/20* (2017.01)

(58) Field of Classification Search
CPC ......... G06T 7/70; G06T 11/60; G06T 19/006;
G05B 2219/32014; G05B 2219/35482;
G05B 2219/39451; G05B 2219/40131;
G05B 2219/40202
See application file for complete search history.

(56) References Cited

U.S. PATENT DOCUMENTS

| | | | |
|---|---|---|---|
| 9,643,314 B2 | 5/2017 | Guerin et al. | |
| 9,902,062 B2 | 2/2018 | Grotmol et al. | |
| 10,078,916 B2 | 9/2018 | Elazary et al. | |
| 10,105,841 B1 | 10/2018 | Szatmary et al. | |
| 10,380,911 B2 | 8/2019 | Hsu et al. | |
| 2004/0189631 A1 | 9/2004 | Kazi et al. | |
| 2013/0073092 A1 | 3/2013 | Hosek | |
| 2016/0055677 A1 | 2/2016 | Kuffner | |
| 2016/0257000 A1 | 9/2016 | Guerin et al. | |
| 2017/0203438 A1 | 7/2017 | Guerin et al. | |
| 2017/0372139 A1* | 12/2017 | Thomasson | G06V 20/20 |
| 2018/0129276 A1 | 5/2018 | Nguyen et al. | |
| 2019/0005848 A1 | 1/2019 | Garcia Kilroy et al. | |
| 2019/0012837 A1 | 1/2019 | Myers | |
| 2019/0139441 A1 | 5/2019 | Akella et al. | |
| 2019/0329405 A1 | 10/2019 | Atohira | |
| 2019/0361589 A1 | 11/2019 | Yerli | |

FOREIGN PATENT DOCUMENTS

| | | |
|---|---|---|
| WO | 2012/151585 A2 | 11/2012 |
| WO | 2015/121742 A1 | 8/2015 |

OTHER PUBLICATIONS

Nonaka et al., "Evaluation of Human Sense of Security for Coexisting Robots using Virtual Reality—1st Report: Evaluation of Pick and Place Motion of Humanoid Robots", Proceedings of the 2004 IEEE International Conference on Robotics and Automation, Apr. 2004, 6 pages.

* cited by examiner

SYSTEM AND METHOD FOR USING VIRTUAL/AUGMENTED REALITY FOR INTERACTION WITH COLLABORATIVE ROBOTS IN MANUFACTURING OR INDUSTRIAL ENVIRONMENT

CROSS-REFERENCE TO RELATED APPLICATION AND PRIORITY CLAIM

This application claims priority under 35 U.S.C. § 119(e) to U.S. Provisional Patent Application No. 62/968,075 filed on Jan. 30, 2020, which is hereby incorporated by reference in its entirety.

TECHNICAL FIELD

This disclosure is generally directed to robotics systems. More specifically, this disclosure is directed to a system and method for using virtual reality or augmented reality for interaction with collaborative robots in a manufacturing or industrial environment.

BACKGROUND

In some environments, testing and implementation of human-robot collaboration can be dangerous due to the high-speed movements and massive forces generated by industrial robots. Wherever humans and industrial robots share a common workplace, accidents are likely to happen and almost always unpredictable. This has hindered the development of human robot collaborative strategies as well as the ability of authorities to pass regulations on how humans and robots should work together in close proximities.

SUMMARY

This disclosure relates to a system and method for using virtual reality or augmented reality for interaction with collaborative robots in a manufacturing or industrial environment.

In a first embodiment, a method includes determining a movement of an industrial robot in a manufacturing environment from a first position to a second position. The method also includes displaying an image showing a trajectory of the movement of the robot on a wearable headset. The displaying of the image comprises at least one of: displaying an augmented reality (AR) graphical image or video of the trajectory superimposed on a real-time actual image of the robot, or displaying a virtual reality (VR) graphical image or video showing a graphical representation of the robot together with the trajectory.

In a second embodiment, a system includes at least one memory configured to store instructions and at least one processor coupled to the at least one memory. The at least one processor is configured when executing the instructions to determine a movement of an industrial robot in a manufacturing environment from a first position to a second position, and control a wearable headset to display an image showing a trajectory of the movement of the robot. The control of the wearable headset comprises at least one of: control the wearable headset to display an AR graphical image or video of the trajectory superimposed on a real-time actual image of the robot, or control the wearable headset to display a VR graphical image or video showing a graphical representation of the robot together with the trajectory.

In a third embodiment, a non-transitory computer readable medium contains instructions that when executed cause at least one processor to determine a movement of an industrial robot in a manufacturing environment from a first position to a second position, and control a wearable headset to display an image showing a trajectory of the movement of the robot on a wearable headset. The control of the wearable headset comprises at least one of: control the wearable headset to display an AR graphical image or video of the trajectory superimposed on a real-time actual image of the robot; or control the wearable headset to display a VR graphical image or video showing a graphical representation of the robot together with the trajectory.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
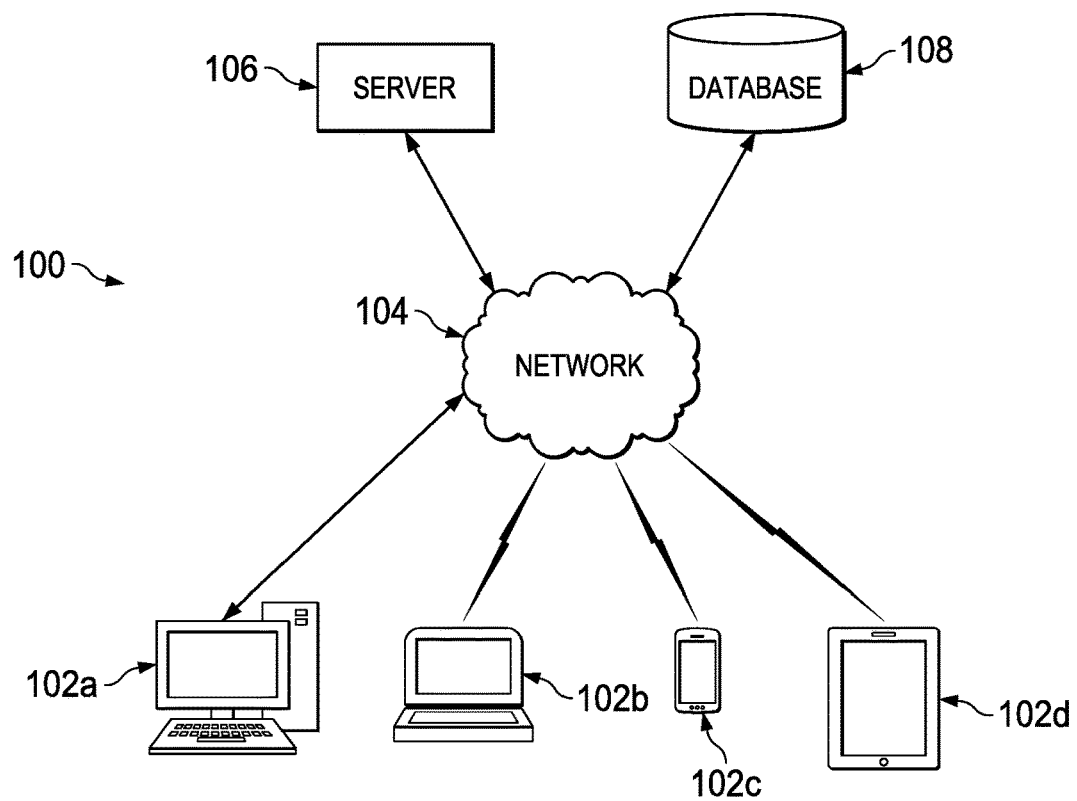
FIG. 1 illustrates an example system for using virtual reality or augmented reality for interaction with collaborative robots in a manufacturing environment according to this disclosure.

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, testing and implementation of human-robot collaboration can be dangerous due to the high-speed movements and massive forces generated by industrial robots. Wherever humans and industrial robots share a common workplace, accidents are likely to happen and almost always unpredictable. In addition, there are multiple hurdles in promoting human collaboration with robotics, including a low adoption rate of technology due to general lack of knowledge, a lack of trust of robotic solutions, and a perception that robots are taking jobs away from humans.

This has hindered the development of human robot collaborative strategies as well as the ability of authorities to pass regulations on how humans and robots should work together in close proximities.

To promote testing and implementation of human-robot collaboration, some existing manufacturing environments use in-person training, in which workers and engineers are walked through a programming or implementation process. Many such systems rely on computer aided design (CAD) to develop robot path programs. However, such programming does not provide worker feedback and adequate realism of the manufacturing environment.

To address these and other issues, this disclosure provides systems and methods for using virtual reality or augmented reality to facilitate interaction between human workers and collaborative robots in a manufacturing environment. As known in the art, virtual reality (VR) generally refers to technology that creates an artificial simulation or recreation of an environment, which may or may not be a real-world environment. Augmented reality (AR) generally refers to technology in which computer-generated content is superimposed over a real-world environment. In AR, an augmented reality scene can be realized when a device is used to overlay a scene rendered using computer-generated graphics onto a real world scene into a single combined scene. In these scenes, the virtual scene is matched to features of the real scene to give the illusion that the virtual objects are actually present in the real world.

As described in more detail below, the systems and methods disclosed herein provide robot trajectory path planning for collaborative robotics (e.g., vehicles and arms) to promote awareness and comfort with adding robotics to an environment which previously may have had limited technology. The disclosed embodiments link AR and VR, motion sensors, and robotics in a manner that promotes a collaborative nature of humans and robotics working together effectively. For example, the disclosed embodiments provide an augmented view for workers or engineers to demonstrate trajectory paths and patterns for high mix manufacturing environments in real-time, including prior to, during, and after robot movement. The disclosed embodiments allow the worker to have a first person immersive experience with working with new technology, and to identify the correct methods of working effectively with robotics in the field. This promotes training, knowledge transfer, trust, and safety around collaborative robots.

FIG. 1 illustrates an example system 100 for using virtual reality or augmented reality for interaction with collaborative robots in a manufacturing environment according to this disclosure. As shown in FIG. 1, the system 100 includes multiple user devices 102a-102d, at least one network 104, at least one server 106, and at least one database 108. Note, however, that other combinations and arrangements of components may also be used here.

In this example, each user device 102a-102d is coupled to or communicates over the network 104. Communications between each user device 102a-102d and a network 104 may occur in any suitable manner, such as via a wired or wireless connection. Each user device 102a-102d represents any suitable device or system used by at least one user to provide information to the server 106 or database 108 or to receive information from the server 106 or database 108.

Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100, such as smart watches, wearable sensors, fitness trackers, and the like. Each user device 102a-102d includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The server 106 is coupled to the network 104 and is coupled to or otherwise communicates with the database 108. The server 106 supports the retrieval of information from the database 108 and the processing of that information. Of course, the database 108 may also be used within the server 106 to store information, in which case the server 106 may store the information itself.

Among other things, the server 106 processes information for using virtual reality or augmented reality for interaction with collaborative robots in a manufacturing environment. The server 106 includes any suitable structure configured to use virtual reality or augmented reality for interaction with collaborative robots in a manufacturing environment. In some embodiments, the server 106 includes one or more processors, one or more memories, and one or more communication interfaces. Note, however, that the server 106 may be implemented in any suitable manner to perform the described functions. Also note that while described as a server here, the device(s) actually implementing the server 106 may represent one or more desktop computers, laptop computers, server computers, or other computing or data processing devices or systems.

The database 108 stores various information used, generated, or collected by the server 106 and the user devices 102a-102d. For example, the database 108 may store robot movement information, robot instruction information, sensor information, AR/VR images and video, and the like.

There are a number of possible ways to implement the system 100 in order to provide the described functionality for using virtual reality or augmented reality for interaction with collaborative robots in a manufacturing environment. For example, in some embodiments, the server 106 and database 108 are owned, operated, or managed by a common entity. In other embodiments, the server 106 and database 108 are owned, operated, or managed by different entities. Note, however, that this disclosure is not limited to any particular organizational implementation.

Although FIG. 1 illustrates one example of a system 100 for using virtual reality or augmented reality for interaction with collaborative robots in a manufacturing environment, various changes may be made to FIG. 1. For example, the system 100 may include any number of user devices 102a-102d, networks 104, servers 106, and databases 108. Also, while FIG. 1 illustrates that one database 108 is coupled to the network 104, any number of databases 108 may reside at any location or locations accessible by the server 106, and each database 108 may be coupled directly or indirectly to the server 106. In addition, while FIG. 1 illustrates one example operational environment in which virtual reality or augmented reality is used for interaction with collaborative robots in a manufacturing environment, this functionality may be used in any other suitable system.

Figure 2:
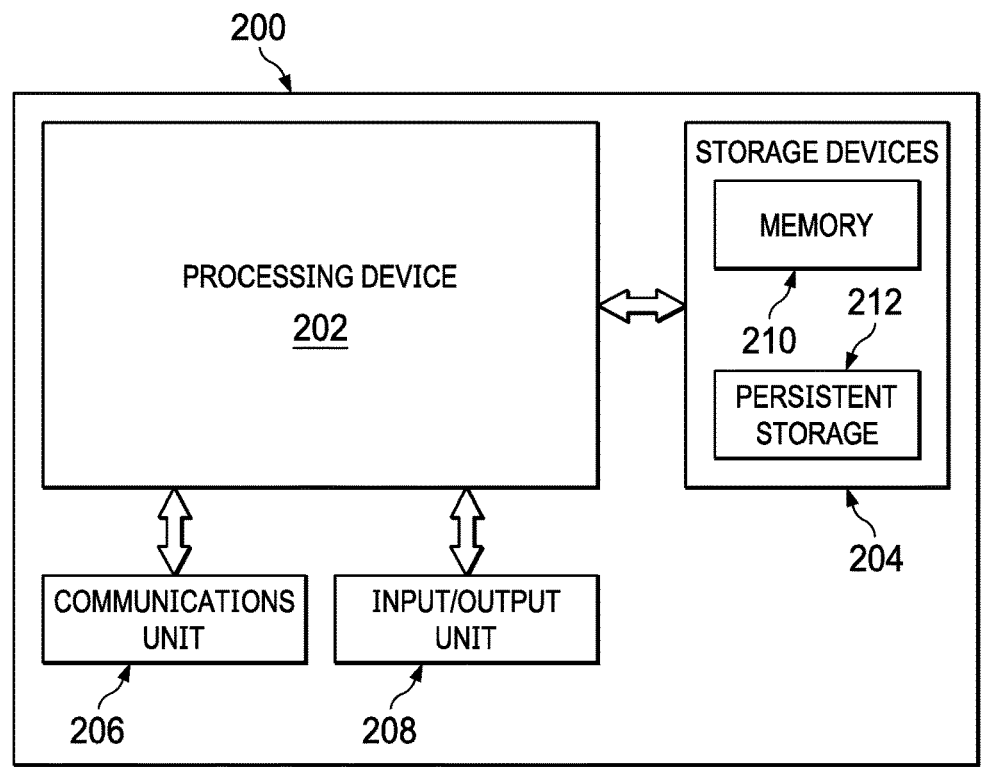
FIG. 2 illustrates an example device for using virtual reality or augmented reality for interaction with collaborative robots in a manufacturing environment according to this disclosure.

FIG. 2 illustrates an example device 200 for using virtual reality or augmented reality for interaction with collaborative robots in a manufacturing environment according to this disclosure. One or more instances of the device 200 may, for example, be used to at least partially implement the functionality of the server 106 of FIG. 1. However, the functionality of the server 106 may be implemented in any other suitable manner. Also, the same or similar arrangement of components may be used to at least partially implement the functionality of one or more of the user devices 102a-102d in FIG. 1. However, the functionality of each user device 102a-102d may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 can be accessed remotely.

In some embodiments, the instructions executed by the processing device 202 can include instructions that implement the functionality of the server 106 described above. For example, the instructions executed by the processing device 202 can include instructions for using virtual reality or augmented reality for interaction with collaborative robots in a manufacturing environment, as described below.

Although FIG. 2 illustrates one example of a device 200 for using virtual reality or augmented reality for interaction with collaborative robots in a manufacturing environment, various changes may be made to FIG. 2. For example, computing devices and systems come in a wide variety of configurations, and FIG. 2 does not limit this disclosure to any particular computing device or system.

Figure 3:
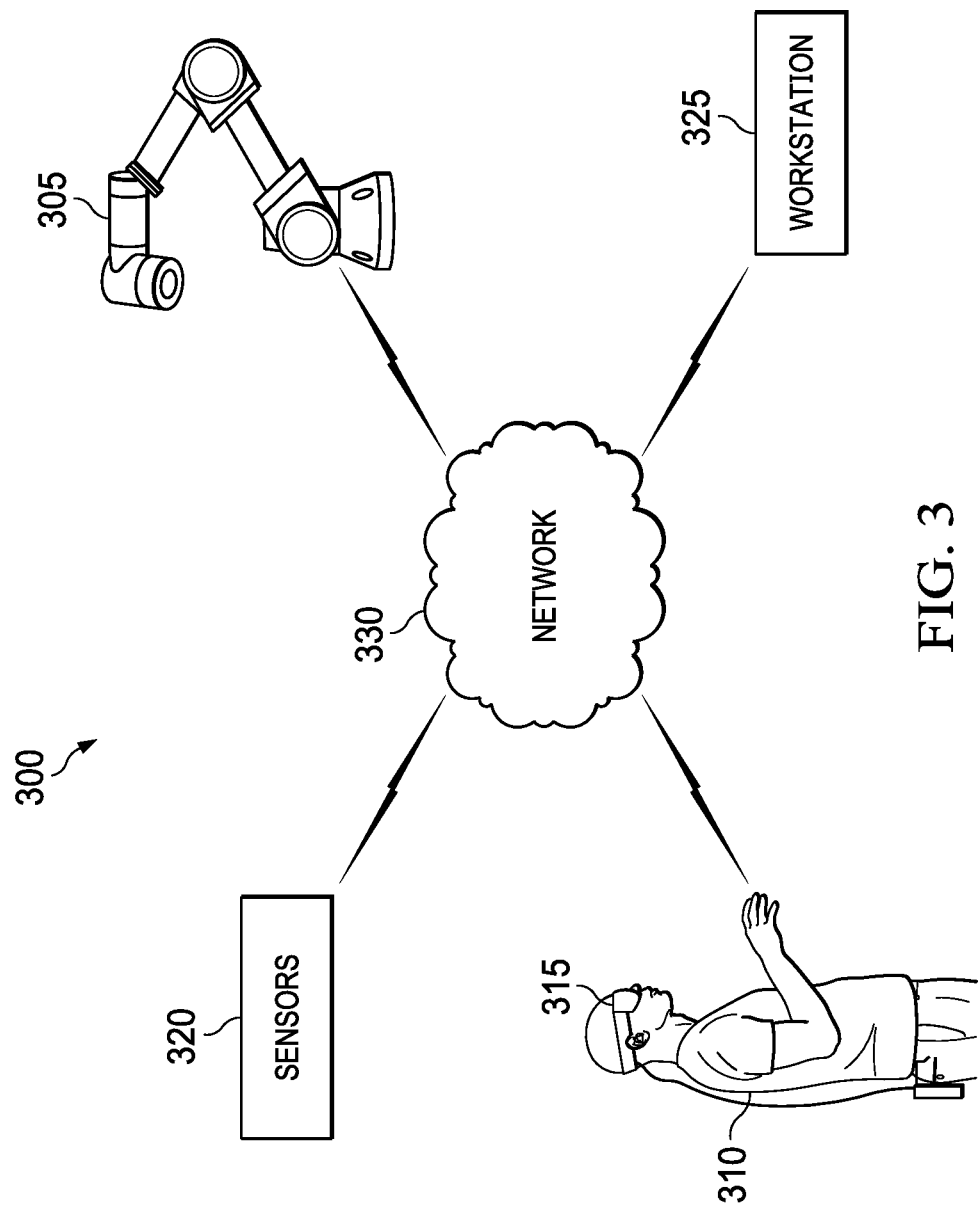
FIG. 3 illustrates an example architecture for using virtual reality or augmented reality for interaction with collaborative robots in a manufacturing environment according to this disclosure.

FIG. 3 illustrates an example architecture 300 for using virtual reality or augmented reality for interaction with collaborative robots in a manufacturing environment according to this disclosure. For ease of explanation, the architecture 300 is described as being implemented using one or more components of the system 100 shown in FIG. 1. However, the architecture 300 could be implemented in any other suitable system.

As shown in FIG. 3, the architecture 300 includes a robot 305, a worker 310, a wearable headset 315, one or more sensors 320, a workstation 325, and a network 330. As described in greater detail below, use of the architecture 300 helps the worker 310 become comfortable with the robot 305, e.g., by seeing a trajectory of movements of the robot 305 before, while, or after they occur.

Figure 4:
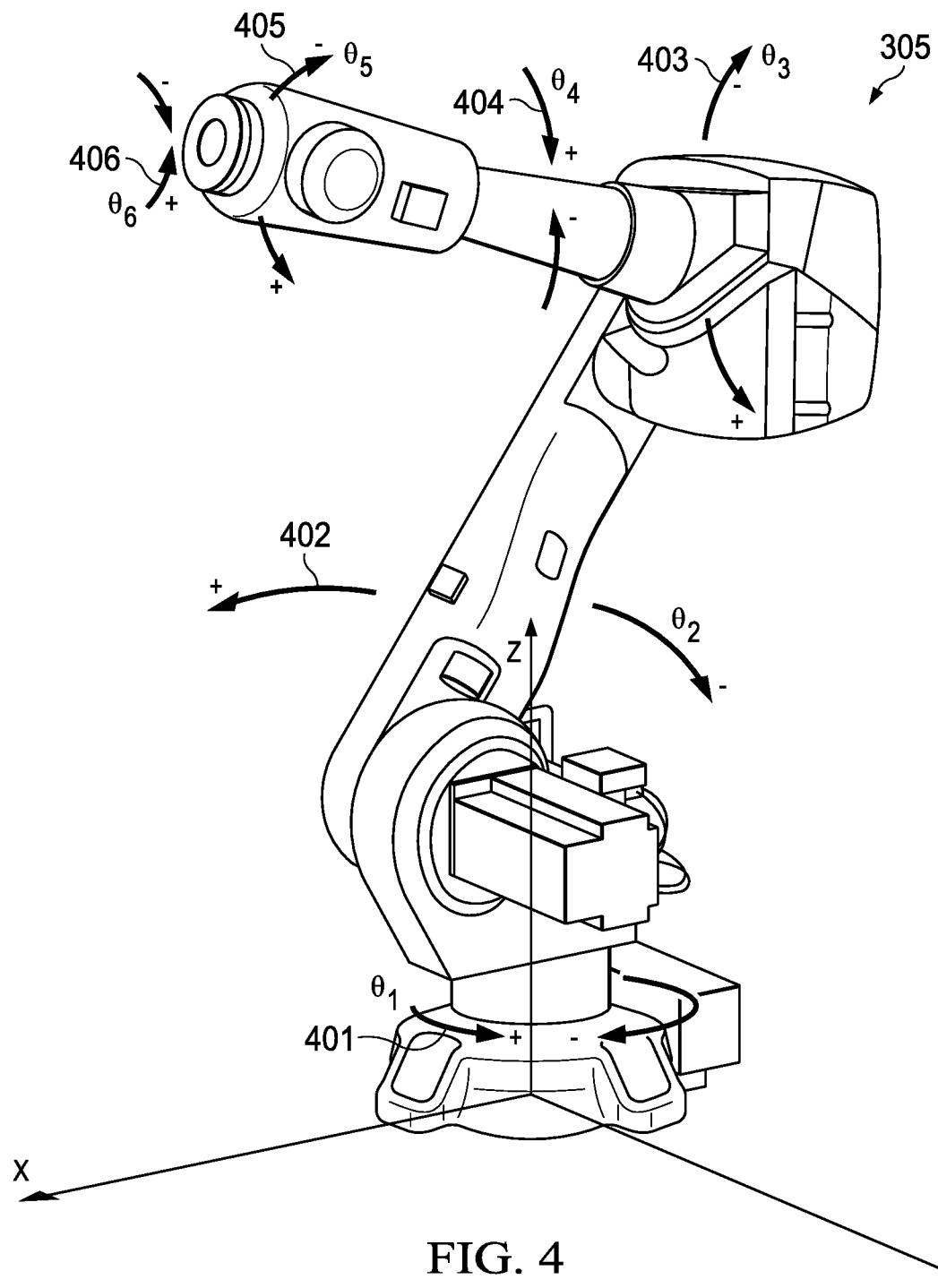
FIG. 4 illustrates an example of a robot that is suitable for use in the architecture of FIG. 3.

The robot 305 is an industrial robot that is used in a manufacturing setting, such as a robot for assembling components. FIG. 4 illustrates an example of a robot 305 that is suitable for use in the architecture 300. As shown in FIG. 4, the robot 305 includes multiple arms, extensions, and rotation points, allowing for multiple degrees of freedom of movement, generally indicated at 401-406. In some embodiments, the robot 305 can be larger than a human, and can be capable of sudden, rapid movements at one or more of the degrees of freedom of movement 401-406, which can result in portions of the robot 305 moving several feet per second or faster.

The worker 310 is a human worker that performs work tasks in the manufacturing setting in which the robot 305 operates. In accordance with this disclosure, the worker 310 and the robot 305 collaborate by performing coordinated operations associated with a manufacturing task. For example, in one task, the robot 305 moves a component to be in the vicinity of the worker 310, and then the worker 310 performs an assembly operation on the component. Once the component is assembled, the robot 305 moves the assembled component away from the worker 310 for further, downstream manufacturing operations. In some environments, the worker 310 is protected from at least some movements of the robot 305 by physical distance or by safety structures (e.g., barriers, walls, cages, etc.). However, in collaborative environments, there may be little separation between the worker 310 and the robot 305. Thus, the robot's movements may present a real or perceived danger to the worker 310.

The wearable headset 315 (also referred to as an AR/VR wearable headset) is a wearable device (such as smart glasses, a head-mounted device (HMD), and the like) that is worn by the worker 310 during collaborative exercises with the robot 305. As described in greater detail below, the wearable headset 315 provides the worker 310 with effective visual training, using AR, VR, or a combination of the two. The visual training helps the worker 310 understand how to work in collaboration with the robot 305. In particular, the wearable headset 315 can provide real time programming visualization feedback to show the trajectory of movements of the robot 305 in different scenarios. The wearable headset 315 can include a wired or wireless communications unit for sending and receiving information associated with displaying AR/VR images, a memory for storing the information, and a processing device for processing the information. In some embodiments, the wearable headset 315 represents (or is represented by) the device 200 of FIG. 2.

The sensors 320 are configured to meter a physical quantity or detect a current state of components in the architecture 300, and convert metered or detected information into an electrical signal. The sensors 320 can include wearable sensors, external sensors, or a combination of the two. Wearable sensors include sensors worn by the worker 310, such as a smart watch, a fitness tracker, or the like. External sensors include sensors that are in the worker's environment (e.g., in the vicinity of the worker) but are not directly worn by the worker. Such sensors can include environmental sensors for detecting and measuring room temperature, light, noise, and the like; machine sensors for measuring product or process parameters (machine speed, tank pressure, material quantities or throughputs, etc.), and any other suitable sensors for measuring conditions in the worker's external environment.

In some embodiments, the sensors 320 can additionally or alternatively include a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, an audio sensor, or a fingerprint sensor. The sensors 320 can also include an inertial measurement unit, which can include one or more accelerometers, gyroscopes, and other components. The sensors 320 can further include a control circuit for controlling at least one of the sensors. Any of these sensors 320 can be a part of, or located within, another component of the architecture 300, such as the robot 305 or the wearable headset 315.

The workstation 325 can be used by the worker 310 or an engineer during training or programming of the robot 305. The workstation 325 includes any suitable computing device, such as a desktop computer, laptop, tablet, mobile phone, and the like. In some embodiments, the workstation 325 may represent (or be represented by) one of the user devices 102a-102d or the server 106 of FIG. 1.

The robot 305, the wearable headset 315, the sensors 320, and the workstation 325 are configured to share information via the network 330. The network 330 represents any suitable network (including wireless, wired, or a combination of the two) for communication of information between the components of the architecture 300. In some embodiments, the network 330 may represent (or be represented by) the network 104 of FIG. 1.

In some embodiments, the manufacturing environment is a high mix, low volume production environment. In such environments, most workers, such as the worker 310, are not familiar with every piece of production hardware the robot 305 is programmed for. That is, while the worker 310 may (or may not) be familiar with some aspects of the robot 305 (or other robots within the manufacturing environment), it is likely that the worker 310 is not familiar with all robot configurations due to high mix production. Thus, the worker 310 having the ability to see performance of the robot 305 prior to operation is helpful.

In one aspect of operation, the worker 310 is in a training environment with the robot 305. In some embodiments, the training environment can be the actual work environment where the robot 305 is used in manufacturing (e.g., the plant floor). In other embodiments, the training environment can be a training lab where the robot 305 is disposed for training purposes.

In the training environment, the worker 310 wears the wearable headset 315, and by looking through the wearable headset 315, the worker 310 can watch the robot 305 perform simple movements, such as pick up an object, move the object to a different location, and put the object down. In some embodiments, the worker 310 controls the robot 305. In other embodiments, the movements of the robot 305 are controlled by someone else or are pre-programmed. In typical manufacturing environments, each robot has predefined paths for multiple types of movement.

In connection with the movement of the robot 305, the wearable headset 315 worn by the worker 310 displays a graphical image of the trajectory of the movement of the robot. In some embodiments, the trajectory can appear as a graphical line from a starting point of the movement to an ending point of the movement. Allowing the worker 310 to visually see the projected trajectory helps to remove hurdles of introducing truly collaborative robotic systems.

Figure 5A:
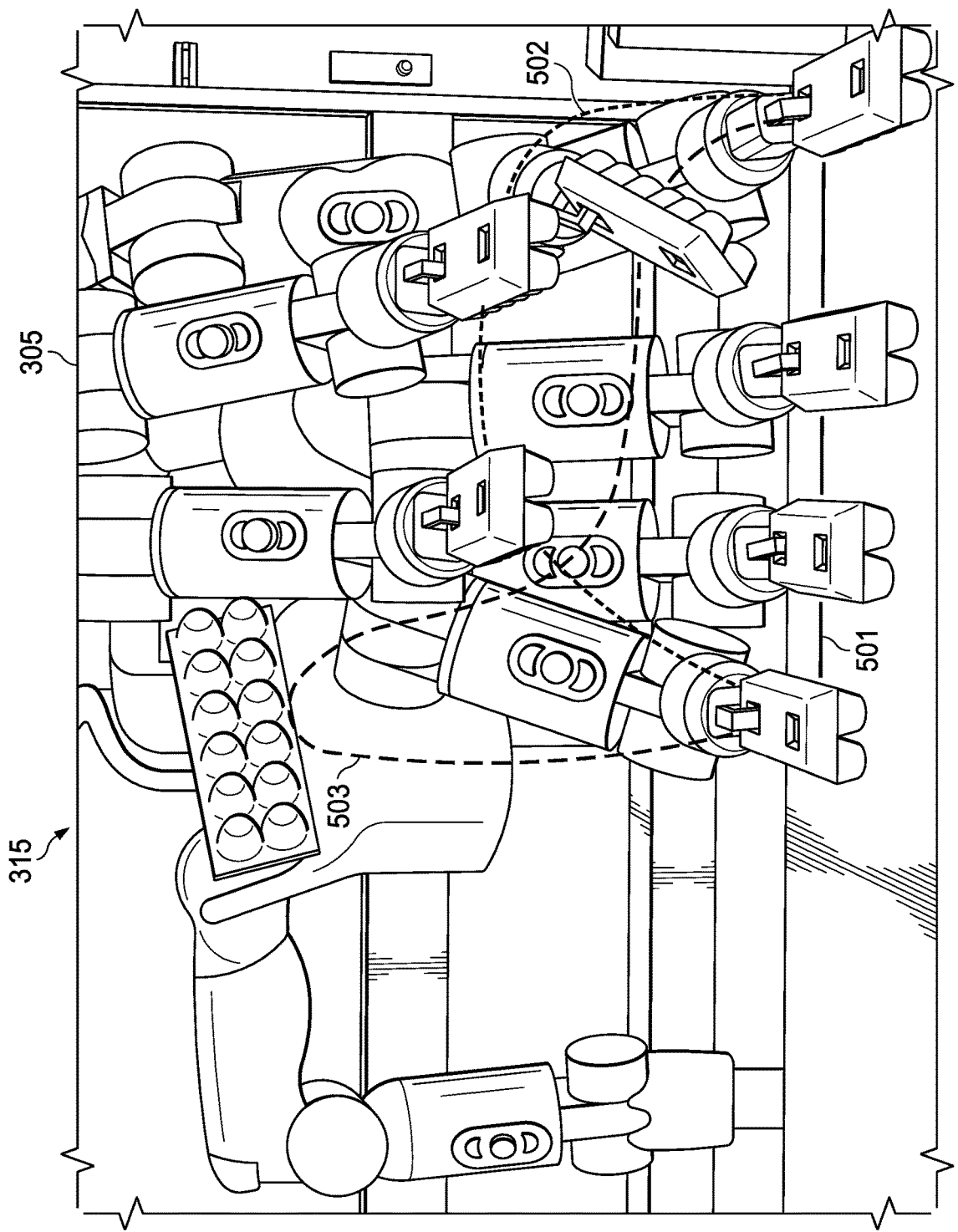
FIG. 5A illustrates examples of trajectories of robot movement displayed on a wearable headset according to this disclosure.

FIG. 5A illustrates examples of trajectories of robot movement displayed on the wearable headset 315 according to this disclosure. As shown in FIG. 5A, the robot 305 performs multiple movements from a first position to a second position. The wearable headset 315 displays one or more trajectories 501-503, which illustrate the path that the robot 305 takes from the first position (i.e., the starting point) to the second position (i.e., the ending point). Using AR techniques, the trajectories 501-503 are displayed superimposed on an actual view of the robot 305. In FIG. 5A, there are three trajectories 501-503 displayed, representing three different movements of the robot 305. Depending on the embodiment, the three trajectories 501-503 may be displayed together on the wearable headset 315 (e.g., to illustrate a range of movements of the robot 305), or only one trajectory 501-503 may be displayed at a time on the wearable headset 315. In addition to displaying the trajectories 501-503 of the robot movement, the wearable headset 315 can display other information associated with movement of the robot 305, such as the robot's path planning, an expected time of execution, or a countdown to the robot movement to allow the worker 310 to feel safe and assured of where the robot 305 is moving in relation to the worker's location.

In some embodiments, the wearable headset 315 may also display a VR image of the robot 305 (e.g., a graphical representation or "cartoon" or the robot) moving in the same path that the actual robot 305 moves. Thus, the wearable headset 315 displays not only just a line or arrow representing movement, but also an actual graphical representation of the robot 305 and its movement.

Figure 5B:
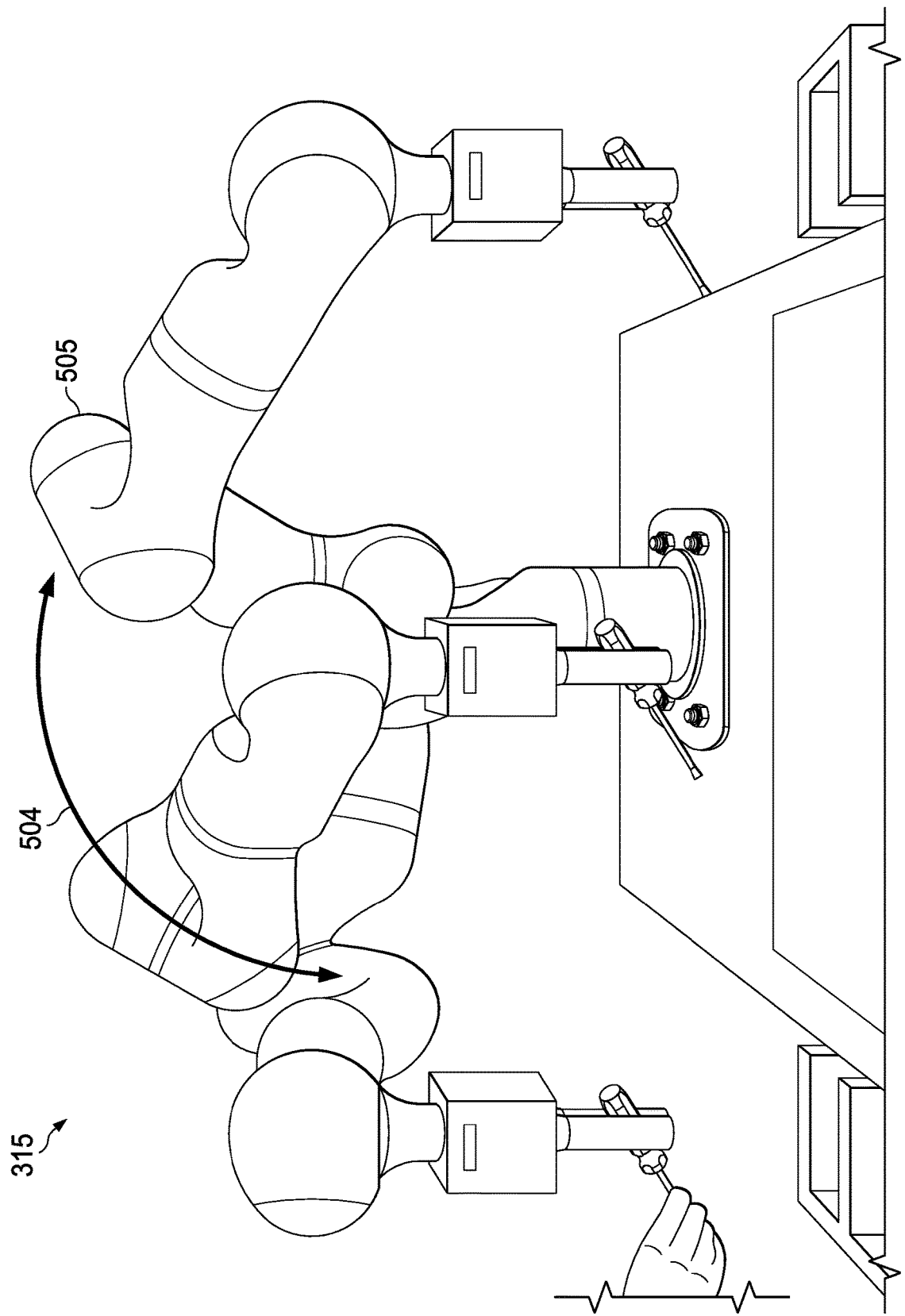
FIG. 5B illustrates an example of images of robot movement displayed on a wearable headset according to this disclosure.

FIG. 5B illustrates an example of VR images of robot movement displayed on the wearable headset 315 according to this disclosure. As shown in FIG. 5B, the wearable headset 315 shows a graphical image 505 of the robot 305 and the robot's movement using VR techniques. Thus, the worker 310 wearing the wearable headset 315 may not see a real-time view of the actual robot 305. The wearable headset 315 also shows a trajectory 504 indicating the movement of the graphical image 505. The VR images shown in FIG. 5B may be useful to the worker 310 when actual movement of the robot 305 does not occur. For example, the VR images 504-505 may be displayed before actual movement of the robot 305, in order to prepare the worker 310 for what is about to occur. As another example, the VR images 504-505 may be displayed after actual movement of the robot 305, so that the worker 310 can review what the worker 310 just saw.

In some embodiments, the worker 310 can move around the robot 305 and see the movement of the robot 305 from different angles, positions, and points of view. In such cases, the VR or AR images, including the graphical images 501-505, are generated based on the current location and orientation of the worker 310, and can change as the location and orientation of the worker 310 changes.

In some embodiments, the sensors 320 allow the worker 310 to know the location and position of the robot 305, allow the robot 305 to know the location of the worker 310, allow the worker 310 or the robot 305 to know other properties of the manufacturing environment, or a combination of these. For example, a motion capture sensor 320 worn by the worker 310 can provide immediate feedback to the robot 305 of where the worker 310 is located, in case the worker 310 has not moved from the robot's projected trajectory. This allows the robot 305 to stop moving or slow its movement to maintain separation between the worker 310 and the robot 305, in order to keep the worker 310 safe within the expected workspace. As another example, a motion capture sensor 320 connected to the robot 305 can provide immediate feedback to the worker 310 of where the robot 305 is located, in case the worker 310 has not moved from the robot's projected trajectory. This allows the worker 310 to move from the path of the robot 305 or pause the movement of the robot 305.

In some embodiments, once the worker 310 completes VR/AR training using the wearable headset 315, completion of the training is fed back to a training system which then authorizes the worker 310 to use the robot 305 in the actual production environment.

The training performed by the worker 310 while wearing the wearable headset 315 can also be in combination with path programming of the robot 305. For example, an engineer can use the training performed by the worker 310 as an extended version of CAD-to-path programming based on real-manufacturing environment scenarios to identify what programming would best fit each scenario.

In one aspect of operation, the engineer can use the workstation 325 to perform robot programming while the worker 310 wearing the wearable headset 315 interacts with the robot 305. In some embodiments, the workstation 325 can display the same information shown in the wearable headset 315. Thus, the worker 310 and engineer can together see in AR or VR views the trajectory paths of the robot 305. In some embodiments, the wearable headset 315 can provide gamification to the worker 310 to have the worker 310 perform numerous simulations in real environments, which can include the display of AR or VR trajectories. While the worker 310 performs the simulations, the engineer observes at the workstation 325, thus allowing the engineer to support CAD-to-path programming for the robot 305.

For example, each simulation can mimic an actual manufacturing scenario. During the simulation, the worker 310 makes specific decisions based on the information and training that the worker 310 has available. Within a few minutes the worker 310 can be informed how successful each decision was. The worker 310 can perform the simulations for training and awareness, and the actions performed by the worker 310 in the simulation can be recorded at the workstation 325 to inform the programming of the robot 305. For example, during the training simulations, the engineer can fix one or more controls or safety parameters. After the fix, the simulation can be performed again to test or demonstrate how the fix affects the operations of the robot 305.

In some embodiments, movements and limitations of the worker 310 (e.g., limit of vertical reach) are observed and recorded during training with the robot 305, and the robot 305 can be programmed to alter its movements to accommodate the capabilities and limitations of the worker 310 (such as if the robot 305 passes a component to the worker 310 or vice versa). Later, in the production environment, a badge or other ID of the worker 310 can be scanned to automatically change reach and trajectory programs of the robot 305 to accommodate the capabilities and limitations of the worker 310.

In some embodiments, the wearable headset 315 can also display work instructions to the worker 310. As known in the art, most manufacturing facilities have a standardized, pre-approved set of work instructions for a worker to perform each manufacturing task, such as assembly of a component or inspection of a product. In accordance with this disclosure, the work instructions displayed on the wearable headset 315 can include information linked to a specific operation of the robot 305. For example, the work instructions can include videos or images of movements of the robot 305. In some embodiments, the worker 310 can initiate robot sequences from the work instructions on the wearable headset 315, such as by providing a user input (e.g., touching a control on the wearable headset 315). In response to the user input, the robot 305 will proceed to move according to its instructions.

In some embodiments, the wearable headset 315 can display other types of training information. For example, the wearable headset 315 may display one or more holographic images showing manufacturing robotic models that depict good or bad operating procedures in the manufacturing environment. The holographic images can represent people, the robot themselves, or a combination of these. Also, in some embodiments, the wearable headset 315 can display a real-time feed of a camera connected to the robot 305 to provide the worker 310 with a "robot view" to verify that an operation has been performed properly by the robot 305.

Although FIG. 3 illustrates one example of an architecture for using virtual reality or augmented reality for interaction with collaborative robots in a manufacturing environment, various changes may be made to FIG. 3. For example, the number of robots, sensors, workers, and networks, and the manner in which these components are arranged and connected, may be different than what is shown in FIG. 3. In general, system architectures come in a wide variety of configurations, and FIG. 3 does not limit this disclosure to any particular arrangement of components.

Figure 6:
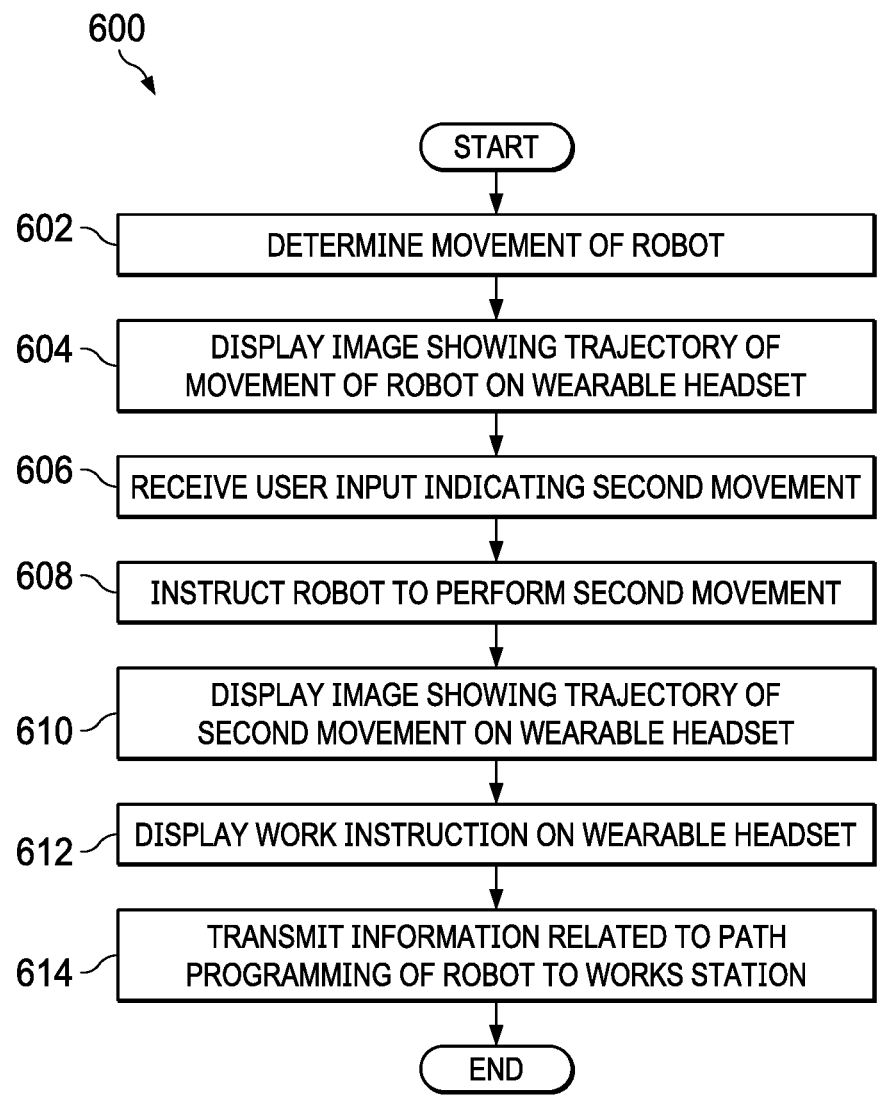
FIG. 6 illustrates an example method for using virtual reality or augmented reality for interaction with collaborative robots in a manufacturing environment according to this disclosure.

FIG. 6 illustrates an example method 600 for using virtual reality or augmented reality for interaction with collaborative robots in a manufacturing environment according to this disclosure. For ease of explanation, the method 600 of FIG. 6 may be described as being performed using the architecture 300 in FIG. 3, which may be implemented using one or more devices 200 of FIG. 2. However, the method 600 may involve the use of any suitable device(s) and architecture(s) in any suitable system(s).

As shown in FIG. 6, a movement of an industrial robot in a manufacturing environment from a first position to a second position is determined at step 602. This may include, for example, a processing device of the wearable headset 315 determining a movement of the robot 305 from a first position to a second position.

At step 604, an image is displayed on a wearable headset, the image showing a trajectory of the movement of the robot. This may include, for example, the wearable headset 315 showing a trajectory of the movement of the robot 305. In particular, this may include, for example, the wearable headset 315 displaying an AR graphical image or video of a trajectory 501-503 superimposed on a real-time actual image of the robot 305, the wearable headset 315 displaying a VR graphical image or video showing a graphical representation 505 of the robot 305 together with the trajectory 504, or a combination of the two. In some embodiments, the trajectory of the movement of the robot 305 is displayed as the robot 305 moves.

At step 606, a user input is received that indicates a desired second movement of the robot. This may include, for example, the worker 310 touching a control on the wearable headset 315 or the workstation 325.

At step 608, instructions are provided to the robot to perform the second movement. This may include, for example, the wearable headset 315 or the workstation 325 transmitting movement instructions to the robot 305.

At step 610, a second image is displayed on the wearable headset, the second image showing a trajectory of the second movement of the robot. This may include, for example, the wearable headset 315 displaying a second AR or VR graphical image showing the trajectory of the second movement of the robot 305.

At step 612, work instructions of a manufacturing task are displayed on the wearable headset. The work instructions are related to movement of the robot during the manufacturing task. This may include, for example, the wearable headset 315 displaying work instructions related to movement of the robot 305.

At step 614, information is transmitted from the wearable headset to a workstation in the manufacturing environment for path programming of the robot. The information is related to one or more actions of a person wearing the wearable headset during a training simulation involving the robot. This may include, for example, the wearable headset 315 transmitting training information to the workstation 325 while the worker 310 performs the training simulation involving the robot 305.

Although FIG. 6 illustrates one example of a method 600 for using virtual reality or augmented reality for interaction with collaborative robots in a manufacturing environment, various changes may be made to FIG. 6. For example, while shown as a series of steps, various steps in FIG. 6 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    determining a movement of an industrial robot in a manufacturing environment from a first position to a second position;
    displaying an image showing a trajectory of the movement of the robot on a wearable headset, which comprises at least one of:
        displaying an augmented reality (AR) graphical image or video of the trajectory superimposed on a real-time actual image of the robot; or
        displaying a virtual reality (VR) graphical image or video showing a graphical representation of the robot together with the trajectory;
    receiving information related to one or more actions of a person wearing the wearable headset during a training simulation involving the robot, the information indicating a movement limitation of the person; and
    transmitting the information to a workstation in the manufacturing environment for path programming of the robot to accommodate the movement limitation of the person.

2. The method of claim 1, further comprising:
    receiving a user input indicating a desired second movement of the robot;
    providing instructions to the robot to perform the second movement; and displaying a second image on the wearable headset showing a trajectory of the second movement of the robot.

3. The method of claim 1, wherein the trajectory of the movement of the robot is displayed as the robot moves.

4. The method of claim 1, further comprising:
changing the image showing the trajectory of the movement of the robot in response to a change of location or orientation, relative to the robot, of the person wearing the wearable headset.

5. The method of claim 1, further comprising:
displaying work instructions of a manufacturing task on the wearable headset, the work instructions related to movement of the robot during the manufacturing task.

6. The method of claim 1, further comprising:
receiving, from at least one sensor, location information of at least one of the robot or the person wearing the wearable headset; and
controlling the movement of the robot based on the location information to maintain separation between the robot and the person.

7. The method of claim 1, wherein the image showing the trajectory of the movement of the robot is displayed on the wearable headset before the movement of the robot occurs.

8. A system comprising:
at least one memory configured to store instructions; and
at least one processor coupled to the at least one memory and configured when executing the instructions to:
determine a movement of an industrial robot in a manufacturing environment from a first position to a second position;
control a wearable headset to display an image showing a trajectory of the movement of the robot, which comprises at least one of:
control the wearable headset to display an augmented reality (AR) graphical image or video of the trajectory superimposed on a real-time actual image of the robot; or
control the wearable headset to display a virtual reality (VR) graphical image or video showing a graphical representation of the robot together with the trajectory;
receive information related to one or more actions of a person wearing the wearable headset during a training simulation involving the robot, the information indicating a movement limitation of the person; and
transmit the information to a workstation in the manufacturing environment for path programming of the robot to accommodate the movement limitation of the person.

9. The system of claim 8, wherein the at least one processor is further configured to:
receive a user input indicating a desired second movement of the robot;
provide instructions to the robot to perform the second movement; and
control the wearable headset to display a second image showing a trajectory of the second movement of the robot.

10. The system of claim 8, wherein the at least one processor is configured to control the wearable headset to display the trajectory of the movement of the robot as the robot moves.

11. The system of claim 8, wherein the at least one processor is further configured to:
control the wearable headset to change the image showing the trajectory of the movement of the robot in response to a change of location or orientation, relative to the robot, of the person wearing the wearable headset.

12. The system of claim 8, wherein the at least one processor is further configured to:
control the wearable headset to display work instructions of a manufacturing task, the work instructions related to movement of the robot during the manufacturing task.

13. The system of claim 8, wherein the at least one processor is further configured to:
receive, from at least one sensor, location information of at least one of the robot or the person wearing the wearable headset; and
control movement of the robot based on the location information to maintain separation between the robot and the person.

14. The system of claim 8, wherein the at least one processor is configured to control the wearable headset to display the image showing the trajectory of the movement of the robot before the movement of the robot occurs.

15. A non-transitory computer readable medium containing instructions that when executed cause at least one processor to:
determine a movement of an industrial robot in a manufacturing environment from a first position to a second position;
control a wearable headset to display an image showing a trajectory of the movement of the robot on the wearable headset, which comprises at least one of:
control the wearable headset to display an augmented reality (AR) graphical image or video of the trajectory superimposed on a real-time actual image of the robot; or
control the wearable headset to display a virtual reality (VR) graphical image or video showing a graphical representation of the robot together with the trajectory;
receive information related to one or more actions of a person wearing the wearable headset during a training simulation involving the robot, the information indicating a movement limitation of the person; and
transmit the information to a workstation in the manufacturing environment for path programming of the robot to accommodate the movement limitation of the person.

16. The non-transitory computer readable medium of claim 15, wherein the instructions further cause the at least one processor to:
receive a user input indicating a desired second movement of the robot;
provide instructions to the robot to perform the second movement; and
control the wearable headset to display a second image showing a trajectory of the second movement of the robot.

17. The non-transitory computer readable medium of claim 15, wherein the trajectory of the movement of the robot is displayed as the robot moves.

18. The non-transitory computer readable medium of claim 15, wherein the instructions further cause the at least one processor to:
control the wearable headset to change the image showing the trajectory of the movement of the robot in response to a change of location or orientation, relative to the robot, of the person wearing the wearable headset.

19. The non-transitory computer readable medium of claim 15, wherein the instructions further cause the at least one processor to:
- control the wearable headset to display work instructions of a manufacturing task, the work instructions related to movement of the robot during the manufacturing task.

20. The non-transitory computer readable medium of claim 15, wherein the instructions further cause the at least one processor to:
- receive, from at least one sensor, location information of at least one of the robot or the person wearing the wearable headset; and
- control movement of the robot based on the location information to maintain separation between the robot and the person.

* * * * *